United States Patent
Nemeth et al.

(10) Patent No.: US 9,238,759 B1
(45) Date of Patent: *Jan. 19, 2016

(54) SYSTEMS AND METHODS FOR ADHERABLE AND REMOVABLE THIN FLEXIBLE GLASS

(71) Applicant: Rockwell Collins, Inc., Cedar Rapids, IA (US)

(72) Inventors: Paul R. Nemeth, Springville, IA (US); James D. Sampica, Springville, IA (US); Kyle P. Dotson, Cedar Rapids, IA (US); Gary N. Prior, Center Point, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,556

(22) Filed: Apr. 22, 2013

Related U.S. Application Data

(63) Continuation of application No. 12/786,169, filed on May 24, 2010, now Pat. No. 8,486,535.

(51) Int. Cl.
| | |
|---|---|
| C03C 17/28 | (2006.01) |
| B32B 17/10 | (2006.01) |
| B32B 17/06 | (2006.01) |
| C09J 7/00 | (2006.01) |
| C09J 7/02 | (2006.01) |

(52) U.S. Cl.
CPC ............... C09J 7/026 (2013.01); B32B 17/064 (2013.01); B32B 17/1033 (2013.01); C03C 17/28 (2013.01)

(58) Field of Classification Search
None
See application file for complete search history.

(56) References Cited

U.S. PATENT DOCUMENTS

| | | | |
|---|---|---|---|
| 3,089,801 A * | 5/1963 | Tierney et al. | 428/332 |
| 4,235,951 A * | 11/1980 | Swarovski | 428/40.4 |
| 5,273,553 A | 12/1993 | Hoshi et al. | |
| 5,329,391 A | 7/1994 | Miyamoto et al. | |
| 5,365,356 A | 11/1994 | McFadden | |
| 5,942,062 A | 8/1999 | Hassall et al. | |
| 5,959,762 A * | 9/1999 | Bandettini et al. | 359/265 |
| 6,366,013 B1 * | 4/2002 | Leenders et al. | 313/479 |
| 6,739,929 B2 | 5/2004 | Furukawa et al. | |
| 6,760,155 B2 | 7/2004 | Murayama et al. | |
| 6,908,202 B2 | 6/2005 | Graf et al. | |

(Continued)

FOREIGN PATENT DOCUMENTS

| | | |
|---|---|---|
| JP | H08-220547 A | 8/1996 |
| JP | 2000-176931 | 6/2000 |

(Continued)

OTHER PUBLICATIONS

Donald, "Method for improving the mechanical properties of oxide glasses," Journal of Materials Science 24, (1989) 4177-4208.*

(Continued)

*Primary Examiner* — David Sample
(74) *Attorney, Agent, or Firm* — Angel Gerdzhikov; Donna Suchy; Daniel Barbieri

(57) ABSTRACT

A flexible assembly is configured to be removably applied to a curved or planar surface of an underlying component. The assembly includes a flexible glass layer and an adhesive layer provided on at least one surface of the flexible glass layer. The flexible glass layer and the adhesive layer in combination enable the flexible assembly to be removably secured to the curved or planar surface.

17 Claims, 3 Drawing Sheets

(56) References Cited

U.S. PATENT DOCUMENTS

| | | | |
|---|---|---|---|
| 6,917,396 | B2 | 7/2005 | Hiraishi et al. |
| 7,030,945 | B2 | 4/2006 | Umemoto et al. |
| 7,361,240 | B2 | 4/2008 | Kim |
| 7,446,938 | B2 | 11/2008 | Miyatake et al. |
| 7,528,915 | B2 | 5/2009 | Choi et al. |
| 7,551,451 | B2 | 6/2009 | Kim et al. |
| 7,633,584 | B2 | 12/2009 | Umemoto et al. |
| 8,045,098 | B2 | 10/2011 | Kitagawa et al. |
| 8,102,487 | B2 | 1/2012 | Kitagawa et al. |
| 8,486,535 | B1 * | 7/2013 | Nemeth et al. ............ 428/426 |
| 8,603,288 | B2 | 12/2013 | Sampica et al. |
| 8,691,043 | B2 | 4/2014 | Sampica et al. |
| 2001/0050372 | A1 * | 12/2001 | Krijn et al. ............ 257/99 |
| 2002/0179229 | A1 | 12/2002 | Chuzles |
| 2002/0187284 | A1 | 12/2002 | Kinoshita et al. |
| 2003/0038916 | A1 | 2/2003 | Nakano et al. |
| 2004/0130073 | A1 | 7/2004 | Yamazaki et al. |
| 2005/0136625 | A1 * | 6/2005 | Henseler et al. ............ 438/479 |
| 2006/0207967 | A1 * | 9/2006 | Bocko et al. ............ 216/24 |
| 2007/0022895 | A1 | 2/2007 | Lee et al. |
| 2008/0145610 | A1 * | 6/2008 | Muller et al. ............ 428/142 |
| 2008/0305721 | A1 * | 12/2008 | Ohashi et al. ............ 451/41 |
| 2009/0046229 | A1 * | 2/2009 | Umemoto et al. ............ 349/118 |
| 2009/0148682 | A1 * | 6/2009 | Higuchi ............ 428/213 |
| 2009/0279175 | A1 | 11/2009 | Laney et al. |
| 2011/0085279 | A1 * | 4/2011 | Lanagan et al. ............ 361/321.1 |

FOREIGN PATENT DOCUMENTS

| | | |
|---|---|---|
| JP | 2003-288028 | 10/2003 |
| JP | 2004-354645 | 12/2004 |
| JP | 2005-005029 | 1/2005 |
| JP | 2005-116346 | 4/2005 |
| JP | 2006-290960 | 10/2006 |
| JP | 2006-348208 | 12/2006 |
| KR | 10-1999-029922 | 4/1999 |
| KR | 2001-166272 | 6/2001 |
| KR | 10-2007-0016614 | 2/2007 |
| WO | WO-2011/089474 A2 | 7/2011 |

OTHER PUBLICATIONS

KIPP, Plastic Material Data Sheets, Online version available at: http://www.knovel.com/web/portal/browse/display?_EXT_KNOVEL_DISPLAY_bookid=1023&VerticalID=0, at least as early as Aug. 10, 2011, 6 pages.

Advisory Action for U.S. Appl. No. 13/538,957, mail date Jun. 14, 2013, 6 pages.

Office Action for U.S. Appl. No. 12/009,375, mail date Jul. 3, 2013, 14 pages.

Office Action for U.S. Appl. No. 12/009,482, mail date Jun. 28, 2013, 22 pages.

U.S. Appl. No. 12/009,372, filed Jan. 18, 2008, Rockwell Collins, Inc.

U.S. Appl. No. 12/009,472, filed Jan. 18, 2008, Rockwell Collins, Inc.

Office Action for U.S. Appl. No. 13/538,957, mail date Apr. 4, 2013, 19 pages.

Notice of Allowance for U.S. Appl. No. 13/420,381, mail date May 20, 2013, 8 pages.

Advisory Action for U.S. Appl. No. 12/009,482, mail date Oct. 28, 2013, 3 pages.

Notice of Allowance for U.S. Appl. No. 12/009,375, mail date Nov. 21, 2013, 12 pages.

Notice of Allowance for U.S. Appl. No. 12/009,472, mail date Sep. 5, 2013, 8 pages.

Notice of Allowance for U.S. Appl. No. 13/538,957, mail date Oct. 3, 2013, 13 pages.

Office Action for Chinese Application No. 200980107294.5, mail date Oct. 8, 2013, 5 pages.

Extended European Search Report for European Patent Application No. 14161363, dated May 16, 2014, 6 pages.

Second Office Action for Chinese Patent Application No. 2009801072945, dated May 30, 2014 with English translation, 4 pages.

English Translation of Japanese Notice of Reasons for Rejection in Japanese Patent Application No. JP 2013-251126, dated Oct. 15, 2014, 3 pages.

Notice of Allowance for U.S. Appl. No. 12/009,482 Dated Oct. 6, 2014, 8 pages.

Notice of Allowance on U.S. Appl. No. 14/019,429 Dated Feb. 5, 2014, 7 pages

Office Action on U.S. Appl. No. 12/009,482 Dated Feb. 4, 2014, 14 pages.

First Office Action with English Translation received in Korean Patent Application No. 10-2010-7017278, dated Feb. 24, 2015, 9 pages.

Non-Final Office Action on U.S. Appl. No. 14/070,251, dated Nov. 6, 2015, 9 pages.

Office Action in Japanese Patent Application 2015-116688, dated Aug. 25, 2015, 4 pages.

Office Action in Japanese Patent Application 2015-116716, dated Aug. 25, 2015, 3 pages.

Office Action with English Translation received in Korean Patent Application 10-2010-7017278, dated Aug. 26, 2015, 5 pages.

* cited by examiner

US 9,238,759 B1

SYSTEMS AND METHODS FOR ADHERABLE AND REMOVABLE THIN FLEXIBLE GLASS

CROSS-REFERENCE TO RELATED APPLICATIONS

The present application claims the benefit of and priority to and is a Continuation of U.S. application Ser. No. 12/786,169, (10CR092 (047141-0699)), filed on May 24, 2010, entitled "SYSTEMS AND METHODS FOR ADHERABLE AND REMOVABLE THIN FLEXIBLE GLASS" by Nemeth et al., and is incorporated herein by reference in its entirety.

BACKGROUND

The present disclosure relates generally to systems and methods for adherable and removable thin flexible glass assemblies. More specifically, the present disclosure relates to an improved flexible glass assembly and a method for making such a flexible glass assembly.

There are many challenges associated with conventional methods of making thin flexible glass assemblies, in particular in connection with manufacturing and/or cutting to size thin flexible glass assemblies having an adhesive layer provided on one surface of the glass assembly. The various embodiments disclosed herein may provide advantages over these conventional methods.

SUMMARY

One embodiment relates to a flexible assembly configured to be removably applied to a curved surface of an underlying component, the assembly comprising a flexible glass layer; and an adhesive layer provided on at least one surface of the flexible glass layer; wherein the flexible glass layer and the adhesive layer in combination enable the flexible assembly to be removably secured to the curved surface.

Another embodiment relates to a method comprising providing a flexible layer of glass material; applying an adhesive layer to at least one side of the flexible layer of glass material to form a flexible assembly; and laser-cutting the flexible assembly to a predetermined size. The flexible assembly is configured to be removably adhered to a curved surface of an underlying component.

Another embodiment relates to a flexible protective assembly configured to be applied to a curved surface of an underlying component, the assembly comprising a flexible glass layer having a thickness in the range of 50-500 microns; an adhesive layer applied to at least one surface of the flexible glass layer; and a backing layer applied to the adhesive layer such that the adhesive layer is provided between the flexible glass layer and the backing layer; wherein the flexible protective assembly is configured to be removably adhered to the curved surface of the underlying component upon removal of the backing layer from the adhesive layer.

DETAILED DESCRIPTION OF EXEMPLARY EMBODIMENTS

Figure 1:
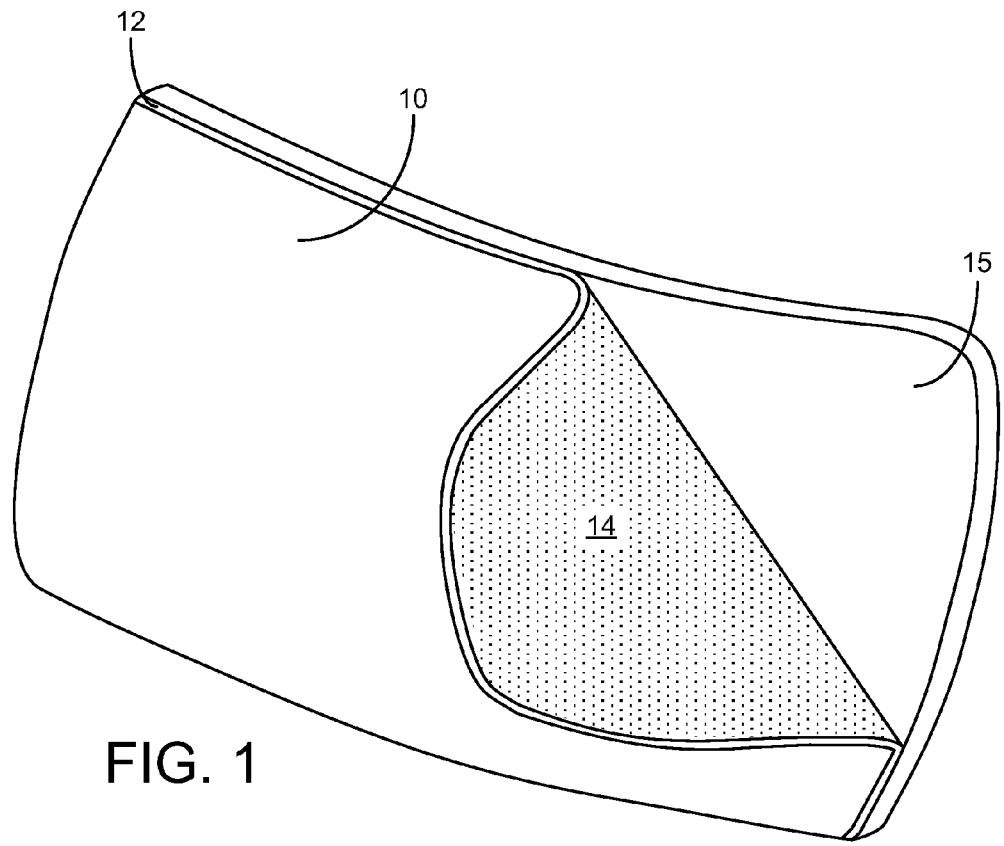
FIG. 1 is a perspective view of a flexible assembly according to an exemplary embodiment.

Referring to FIG. 1, a flexible assembly 10 is shown according to an exemplary embodiment. As shown in FIG. 1, flexible assembly 10 includes a glass layer 12 and an adhesive layer 14. Flexible assembly 10 may be removably secured to an underlying component 15 (e.g., a windshield, a touchscreen, an LCD display). As discussed further herein, flexible assembly 10 may be rollable onto a roll for storage, manufacturing, and/or further processing. As also discussed further herein, flexible assembly 10 may take any suitable shape and be cut to any suitable dimensions to suit a particular application. Further, flexible assembly may be applied to either curved or flat surfaces based on the specific application.

Figure 2:
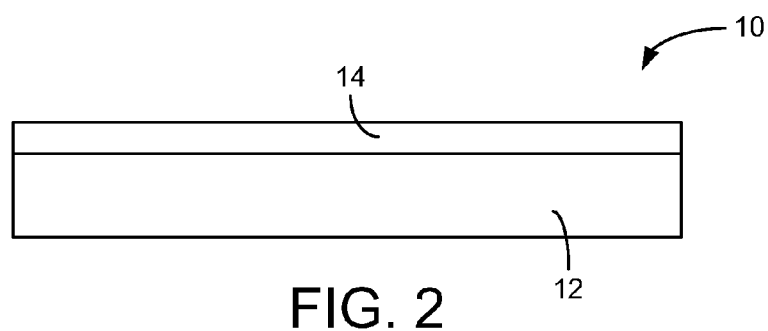
FIG. 2 is a cross section view of the flexible assembly of FIG. 1 according to an exemplary embodiment.

Referring to FIG. 2, a cross-sectional view of flexible assembly 10 is shown according to an exemplary embodiment. As shown in FIG. 2, glass layer 12 may be a generally planar, flexible material upon which adhesive layer 14 is provided. In various embodiments, glass layer 12 has a thickness of approximately 50-500 microns (micrometers), or 50-200 microns. In various other embodiments, the thickness of glass layer 12 may be varied to suit any particular application. The thickness of adhesive layer 14 may be in the range of 25-1000 microns, or 125-250 microns. In various alternative embodiments, the thickness of adhesive layer 14 may be varied to suit a particular application.

According to one embodiment, glass layer 12 is comprised of materials such as an aluminosilicate, a borosilicate, soda-lime, and the like. Other materials may be included as part of the composition of glass layer 12 to provide appropriate characteristics for specific applications (e.g., to provide appropriate flexibility, optical properties, durability, and the like). Glass layer 12 may be provided in a rolled form, as a sheet good, or in any other suitable form. According to various alternative embodiments, one or more of any of a number of types of adhesive layers may be applied to glass layer 12. For example, adhesive layer 14 may include a pressure sensitive adhesive (PSA) such as an acrylic or silicone, an epoxy based adhesive layer, a water activated adhesive layer, or a self-wetting adhesive layer. Such adhesives may provide for easy application and/or removal of the flexible assembly to/from other objects/underlying components (e.g., the adhesive layer may include an adhesive having a low peel strength such that the adhesive may be easily peeled off of an underlying component and/or reapplied to/repositioned on the component). In one embodiment, adhesive layer 14 may be applied using a direct dry film lamination process, such as that disclosed in co-pending U.S. application Ser. No. 12/009,375, filed Jan. 18, 2008, or in co-pending U.S. application Ser. No. 12/009,482, filed Jan. 18, 2008, both of which are incorporated by reference herein in their entireties. In yet further embodiments, adhesive layer 14 may be applied using a web method, a roller method, a meniscus coating method, a spray coating method, or any other suitable coating method.

Figure 3:
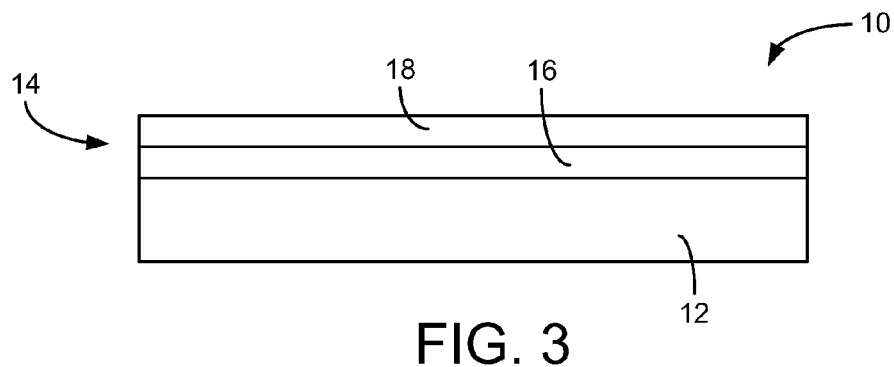
FIG. 3 is a cross section view of the flexible assembly of FIG. 1 according to another exemplary embodiment.

Referring to FIG. 3, a cross-sectional view of flexible assembly 10 is shown according to another exemplary embodiment. As shown in FIG. 3, flexible assembly 10 includes glass layer 12 and adhesive layer 14. Adhesive layer 14 may further include an adhesive material 16 upon which a backing material or layer 18 is applied. Backing material 18 may be a thin, removable film intended to be retained on or coupled to adhesive material 16 until flexible assembly 10 is applied to an object. Backing material 18 may be removed, thereby exposing adhesive material 16 and enabling a user to adhesively secure flexible assembly 10 to an object. Any suitable backing material may be used and the thickness and material composition of the backing material may vary based on a particular application. In one embodiment, adhesive material 16 and backing layer 18 may be part of a pressure sensitive adhesive, and may be provided as a rolled good. In some embodiments, backing layer 18 may include polyester or polypropylene.

Figure 4:
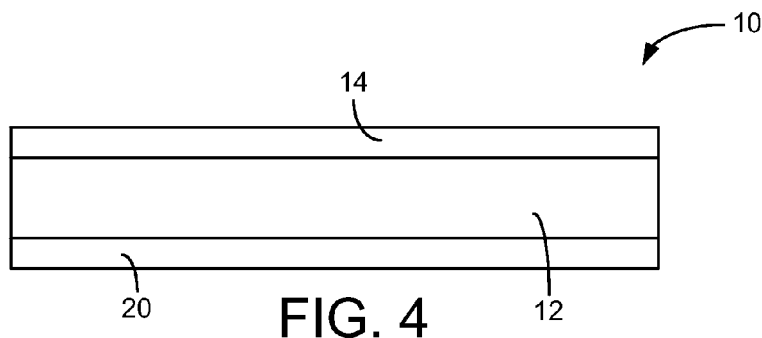
FIG. 4 is a cross section of the flexible assembly of FIG. 1 according to yet another exemplary embodiment.

Referring to FIG. 4, a cross sectional view of flexible assembly 10 is shown according to yet another exemplary embodiment. As shown in FIG. 4, flexible assembly 10 may include glass layer 12, adhesive layer 14, and an additional thin film layer 20. Further, flexible assembly 10 shown in FIG. 4 may be provided with or without a backing material or layer such as backing layer 18 shown in FIG. 3. According to various alternative embodiments, thin film layer 20 may provide for improved optical or other performance characteristics (e.g., durability, anti-glare, fingerprint resistance, etc.) of flexible assembly 10. For example, thin film layer 20 may be configured to reduce reflection, provide additional EMI protection, provide additional UV protection, and the like. In one embodiment, thin film layer 20 comprises indium tin oxide (ITO) and is a metalized transparent coating configured to enhance the EMI shielding properties of flexible assembly 10. According to various other embodiments, other types of thin film layers may be utilized to suit a particular application, and the thin films may be of a variety of thicknesses, colors, and so on.

Figure 5:
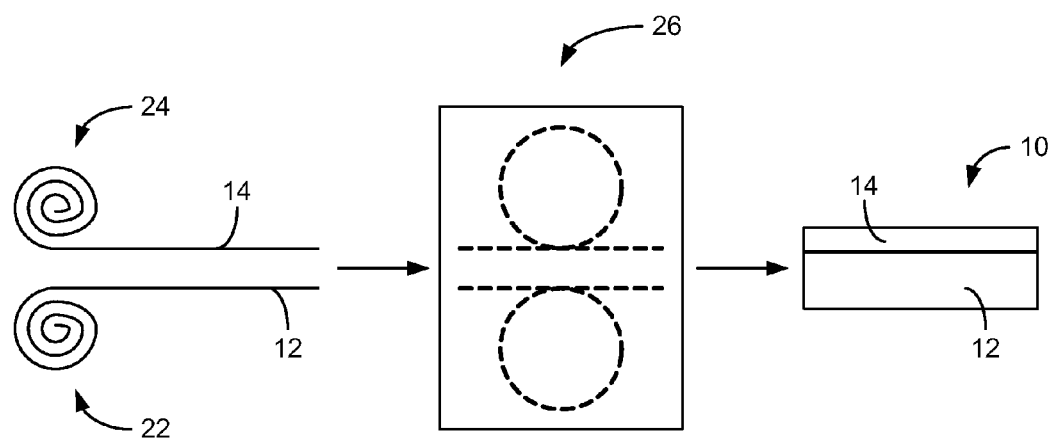
FIG. 5 is a schematic representation of a method of making a flexible assembly according to an exemplary embodiment.

Referring to FIG. 5, a schematic representation of a process for manufacturing flexible assembly 10 is shown according to an exemplary embodiment. As shown in FIG. 5, glass layer 12 may be provided in the form of a first roll of material 22, and adhesive layer 14 may be provided in the form of a second roll of material 24. As further shown in FIG. 5, glass layer 12 and adhesive layer 14 may be unrolled from rolls 22, 24 and moved through a device 26 (e.g., a lamination device such as a roll-to-roll lamination device, a bonding device, etc.). According to various exemplary embodiments, device 26 may be a lamination device that provides a roll-to-roll lamination of glass layer 12 and adhesive layer 14. According to other embodiments, lamination device 26 may use any suitable lamination technique (e.g., a dry film lamination process) to laminate glass layer 12 to adhesive layer 14 such that flexible assembly 10 is provided as an end product of the lamination process. According to various alternative embodiments, any sized rolls 22, 24 and any width of material for the glass layer 12 and/or adhesive layer 14 may be utilized in connection with the process illustrated in FIG. 5. Alternatively, glass layer 12 and/or adhesive layer 14 may be provided as a flat sheet of material (e.g., in a non-rolled form). Furthermore, additional steps may be performed in addition to those shown in FIG. 5, such as further processing of flexible assembly 10 and/or prior processing of rolls 22, 24.

Figure 6:
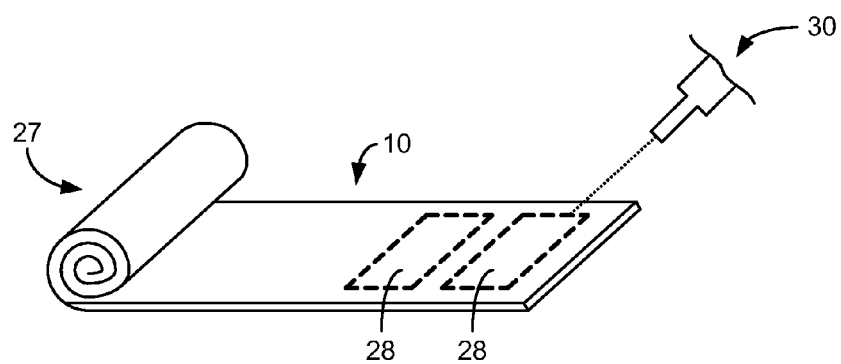
FIG. 6 is a schematic representation of a method of making pre-cut assemblies of flexible material according to an exemplary embodiment.

Referring to FIG. 6, a schematic representation of a process of providing pre-cut flexible assemblies is shown according to an exemplary embodiment. As shown in FIG. 6, flexible assembly 10 may be provided in the form of a third roll 27. In one embodiment, third roll 27 may be provided as a result of the manufacturing process illustrated in the embodiment shown in FIG. 5. According to various other embodiments, third roll 27 may be manufactured using a variety of other methods such as those disclosed elsewhere herein, and may be provided in strips, sheets, or other form than a rolled good. As further shown in FIG. 6, a cutting device 30 may be provided. In one embodiment, cutting device 30 may be a laser cutting device (e.g., a 266 nm laser cutting device or a 355 nm laser cutting device). In various other embodiments, any suitable cutting device may be utilized such as a water jet cutting device, a mechanical cutting device, or any other suitable cutting device.

As shown in FIG. 6, a flexible material provided on third roll 27 may be unrolled and subsequently one or more pre-cut assemblies 28 may be cut utilizing cutting device 30 (e.g., as part of a laser cutting process). Pre-cut assemblies may be cut to a pre-determined size based upon the shape and size of an object (e.g., an underlying component such as an LCD display, touchscreen, windshield, etc.) to which pre-cut assembly 28 is to be applied. According to various alternative embodiments, other manufacturing steps may be additionally performed.

For example, various laser cutting methods require that the sheet of material being cut be relatively flat (e.g., to avoid fracturing and/or cracking of the glass material that may otherwise occur due to mechanical stresses present with a non-flat material). In the case of a rolled good, the sheet of material may have a formed curvature as a result of the rolling process. In such cases, it may be necessary to perform a flattening step. For example, the roll may be reversed such that a sheet rolled in one direction is reversed and rolled in a second direction, thereby tending to flatten out the sheet. Alternatively, a flattening press may be utilized to remove any curvature from the sheet. The flattening step may be performed before and/or after application of the adhesive layer to the glass layer. In another embodiment, a flattening device may be utilized that tends to remove any curvature to the sheet. The flattening device may utilize increased temperature and/or pressure to facilitate flattening of the assembly to a suitable flatness.

According to one embodiment, specific parameters may be used as part of a laser cutting process to cut flexible assembly 10 into pre-cut assemblies 28. For example, such parameters may include an appropriate wavelength for the laser and/or an appropriate pulse rate for the laser. According to one embodiment, the wavelength utilized in connection with the laser cutting process is in the range of 266-355 nm. According to a further embodiment, the wavelength utilized is approximately 266 nm. The exact wavelength utilized may vary (e.g., be less than 266 nm or more than 355 nm) based on the thickness and/or material composition of glass layer 12 and/or adhesive layer 14 in addition to any other components that may be applied to the flexible assembly. In the wavelength range of 266-355 nm, the laser cutting device (e.g., a short pulse laser cutting device) may cut at a speed of approximately 40 mm per second, although slower or faster speeds may be utilized according to other embodiments. In one embodiment, a laser cutting device such as device 30 may be "tuned" for a particular assembly such that the laser cuts both the glass layer and the adhesive layer.

Figure 7:
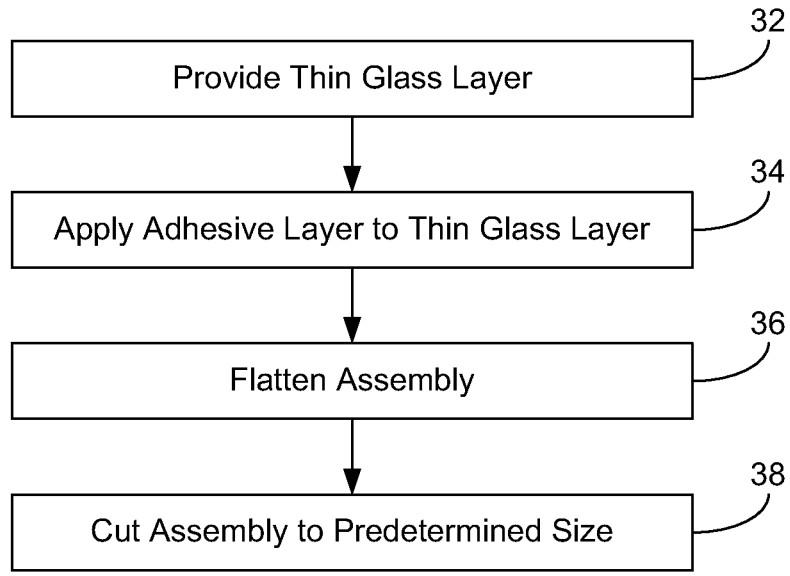
FIG. 7 is a block diagram of a method of making a flexible assembly according to an exemplary embodiment.

Referring now to FIG. 7, a method of manufacturing a flexible assembly such as flexible assembly 10 is shown according to an exemplary embodiment. First, a thin glass layer is provided (step 32). The thin glass layer may be a glass layer such as glass layer 12 disclosed herein. Next, an adhesive is applied to the thin glass layer (step 34). The adhesive may be an adhesive such as adhesive layer 14 disclosed herein (e.g., with an adhesive material 16 and a backing material 18).

Applying the adhesive to the glass layer forms a flexible glass assembly, such as flexible glass assembly 10. Next, the assembly is flattened (if required) (step 36) using a reverse rolling process, a flattening press or device, or another suitable device or method. It should be noted that an additional flattening step may be performed prior to application of the adhesive (prior to step 34). Next, the assembly may be pre-cut to a desired or predetermined shape. According to one embodiment, the assembly may be laser cut to a shape matching at least a portion of an underlying object or component (e.g., an LCD display, a touchscreen assembly, a vehicle windshield, etc.) to which the assembly is to be applied. The completed flexible assembly may then be applied/removed to a desired underlying object, as further discussed in connection with the embodiment of FIG. 8.

Figure 8:
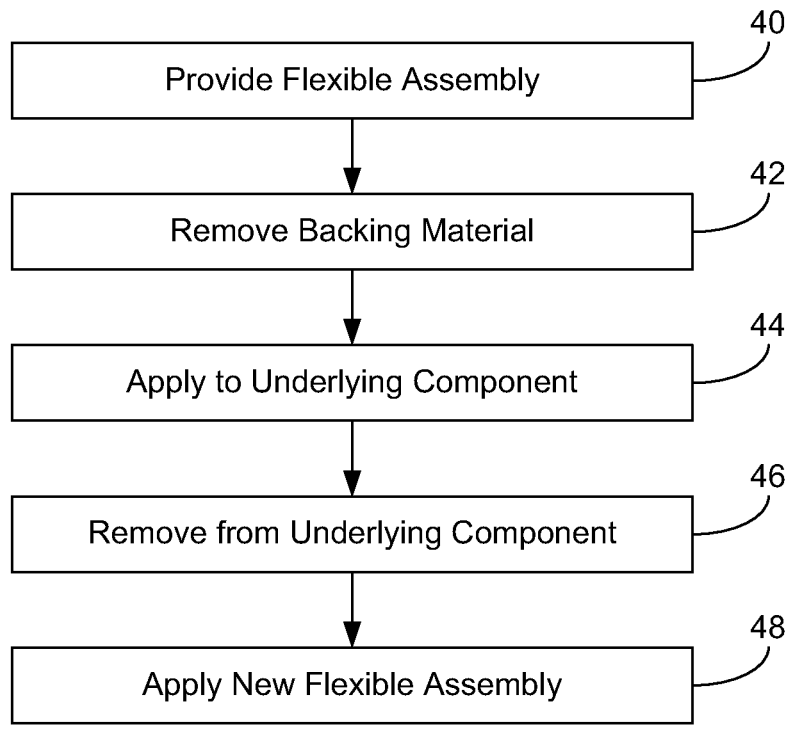
FIG. 8 is a block diagram of a method of applying a flexible assembly according to an exemplary embodiment.

Referring now to FIG. 8, a method of applying, removing, and replacing a flexible assembly such as flexible assembly 10 is shown according to an exemplary embodiment. First, a flexible assembly such as flexible assembly 10 is provided (step 40). In one embodiment, a pre-cut assembly such as pre-cut assembly 28 may be provided (e.g., as a result of a method such as the method illustrated in FIG. 7). The assembly may include a backing layer (e.g., backing layer 18) that temporarily covers an adhesive layer of material (e.g., adhesive material 16). The backing layer is removed (step 42), and upon removal of the backing layer, the assembly may be fit to a desired component (e.g., LCD display, touchscreen, windshield, etc.). Alternatively, a water-activatable adhesive may be used, such that a backing layer may or may not be necessary, and the water-activatable adhesive is wetted prior to application to an underlying object or component. In one embodiment, the assembly is flexible and may be fit to a curved or irregular surface of an underlying object. Further, the assembly may be substantially transparent, such that the assembly does not appreciably effect the optical performance of any underlying components such as displays, transparent objects such as windshields, and so on. Once applied to the underlying component, the assembly is configured to be fixed in place until it is desirable to remove and/or replace the assembly, (e.g., due to wear and tear of the assembly, required maintenance of the underlying component, etc.). The assembly may then be removed (e.g., in a peelable fashion) (step 46) and a new assembly may be put into place (step 48).

It should be noted that the flexible assembly disclosed in the various embodiments herein may provide various advantages over more traditional assemblies. For example, the flexibility and adhesive layer integrated into the flexible assemblies disclosed herein make the flexible assemblies usable in a wider range of applications than more traditional assemblies that may lack these features. Further, flexible assembly 10 may permit correctly sized flexible compliant glass substrates to be incorporated into designs such that raw material costs are reduced, design capabilities are improved, and the life of the underlying components to which the flexible assembly is applied is lengthened. For example, flexible assembly 10 may be utilized in combination with various substrate materials such as windshields or other rigid, curved-glass materials. The application of flexible assembly 10 to such substrates may provide a removable first surface that protects the underlying substrate or other material. As disclosed herein, additional film coatings may be applied to flexible assembly 10 to provide enhanced optical performance in the areas of EMI protection, UV protection, abrasion resistance, etc.

The thin adherable flexible assemblies described herein may permit designers options of locating substrates in tighter design spaces while providing for easier and lower cost lamination approaches to flexible assemblies such as flexible assembly 10, having both a flexible glass layer and an adhesive layer provided on the glass layer. Further, various embodiments of the flexible assembly disclosed herein provide a robust, ultra-thin, lightweight, and flexible adherable glass desirable for applications such as liquid crystal display (LCD) assemblies, touch screen assemblies, vehicle windshield assemblies, and other applications where, for example, protection from wear and damage may be required due to the nature of use and/or environment of such underlying assemblies. Further yet, the flexible assembly may be a removeable, repositionable, and/or replaceable "first surface item" (e.g., a protective layer, etc.), such that upon receiving a certain degree of wear, a used flexible assembly may be replaced with a new flexible assembly without having to replace/repair the underlying components or do substantial work to remove/reapply the flexible assembly.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is important to note that the construction and arrangement of the elements of the flexible assembly as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A flexible assembly configured to be removably applied to a curved surface of an underlying component, the assembly comprising:
   a flexible glass layer comprising an aluminosilicate material; and
   an adhesive layer provided on at least one surface of the flexible glass layer;
   wherein the flexible glass layer and the adhesive layer in combination enable the flexible assembly to be removably secured to the curved surface,
   wherein the flexible assembly is in the form of a roll,
   wherein the adhesive layer has a thickness in the range of approximately 125-250 nanometers.

2. The assembly of claim 1, wherein the glass layer has a thickness in the range of approximately 50-500 microns.

3. The assembly of claim 1, wherein the adhesive layer comprises a pressure sensitive adhesive.

4. The assembly of claim 1, wherein the glass layer and adhesive layer are provided as rolled materials and laminated together.

5. The assembly of claim 1, wherein the adhesive layer comprises a spray coating of adhesive.

6. The assembly of claim 1, wherein the adhesive layer includes a removable protective layer, the protective layer configured to be removed prior to applying the flexible assembly to an object.

7. A method comprising:
provide a flexible layer of glass material comprising an aluminosilicate material;
applying an adhesive layer to at least one side of the flexible layer of glass material to form a flexible assembly; and
laser-cutting the flexible assembly to a predetermined size,
wherein the adhesive layer has a thickness of 125-250 nanometers and the flexible assembly is in the form of a roll.

8. The method of claim 7, wherein the flexible glass layer of material has a thickness in the range of approximately 50-500 microns.

9. The method of claim 7, wherein the flexible layer of glass material has a curvature, and further comprising flattening the flexible layer of glass material.

10. The method of claim 7, wherein the adhesive is a pressure sensitive adhesive and includes a removable layer configured to be removed prior to application of the flexible protective material to an object.

11. The method of claim 7, wherein laser-cutting the flexible protective coating to a predetermined size includes utilizing a laser wavelength in the range of 50-500.

12. The method of claim 7, wherein applying the adhesive layer to at least one side of the flexible glass material comprises utilizing a roll to roll lamination process.

13. A flexible protective assembly configured to be applied to a curved surface of an underlying component, the assembly comprising:
a flexible glass layer having a thickness in the range of 50-500 microns and comprising an aluminosilicate material;
an adhesive layer applied to at least one surface of the flexible glass layer; and
a backing layer applied to the adhesive layer such that the adhesive layer is provided between the flexible glass layer and the backing layer;
wherein the flexible protective assembly is configured to be removably adhered to the curved surface of the underlying component upon removal of the backing layer from the adhesive layer,
wherein the flexible assembly is in the form of a roll,
wherein the adhesive layer has a thickness in the range of approximately 125-250 nanometers.

14. The assembly of claim 13, further comprising an additional thin film layer provided on an opposite surface of the flexible glass layer from the adhesive layer, the additional thin film layer configured to enhance optical properties of the flexible protective assembly.

15. The assembly of claim 13, wherein the adhesive layer comprises at least one of a pressure sensitive adhesive and a water-activated adhesive.

16. The assembly of claim 13, wherein the flexible glass layer and the adhesive layer are formed from rolled goods.

17. The assembly of claim 13, wherein the underlying component comprises at least one of a liquid crystal display and a touchscreen display.

\* \* \* \* \*